US006842742B1

(12) United States Patent
Brookner

(10) Patent No.: US 6,842,742 B1
(45) Date of Patent: Jan. 11, 2005

(54) SYSTEM FOR PROVIDING EARLY WARNING PREEMPTIVE POSTAL EQUIPMENT REPLACEMENT

(75) Inventor: George Brookner, Norwalk, CT (US)

(73) Assignee: Ascom Hasler Mailing Systems, Inc., Shelton, CT (US)

(*) Notice: Subject to any disclaimer, the term of this patent is extended or adjusted under 35 U.S.C. 154(b) by 429 days.

(21) Appl. No.: 09/628,763

(22) Filed: Jul. 31, 2000

Related U.S. Application Data

(63) Continuation of application No. 08/981,659, filed as application No. PCT/US97/06837 on Apr. 23, 1997, now Pat. No. 6,098,032.

(60) Provisional application No. 60/043,445, filed on Apr. 9, 1997, and provisional application No. 60/015,526, filed on Apr. 23, 1996.

(51) Int. Cl.[7] .................................................. G06F 17/60

(52) U.S. Cl. ............................ 705/60; 70/401; 70/409; 70/410; 380/51; 377/16; 700/108

(58) Field of Search ................................ 705/401, 410, 705/408, 63, 412, 11; 380/51; 377/16, 15, 13; 700/108, 110, 111

(56) References Cited

U.S. PATENT DOCUMENTS

| | | | | | |
|---|---|---|---|---|---|
| 3,147,370 | A | * | 9/1964 | Lowman | 177/25.14 |
| 3,344,408 | A | * | 9/1967 | Singer et al. | 340/870.11 |
| 3,351,910 | A | * | 11/1967 | Miller et al. | 368/107 |
| 3,377,471 | A | * | 4/1968 | Althus et al. | 377/16 |
| 4,234,926 | A | | 11/1980 | Wallace et al. | |
| 4,251,874 | A | * | 2/1981 | Check, Jr. | 177/25.15 |
| 4,864,506 | A | | 9/1989 | Storace | 364/464.02 |
| 4,931,963 | A | * | 6/1990 | Kimura et al. | 702/184 |
| 5,008,827 | A | | 4/1991 | Sansone et al. | |
| 5,043,908 | A | | 8/1991 | Manduley et al. | |
| 5,063,857 | A | | 11/1991 | Kissel, Jr. | |
| 5,122,976 | A | * | 6/1992 | Bellows et al. | 702/185 |
| 5,276,844 | A | | 1/1994 | Aebi et al. | |
| 5,581,228 | A | | 12/1996 | Cadieux et al. | 340/146.2 |
| 5,638,442 | A | * | 6/1997 | Gargiulo et al. | 380/2 |
| 5,668,973 | A | | 9/1997 | Stutz et al. | 711/152 |
| 5,799,093 | A | * | 8/1998 | French et al. | 380/51 |
| 5,812,991 | A | * | 9/1998 | Kara | 235/375 |
| 6,098,032 | A | | 8/2000 | Brookner | 702/182 |

FOREIGN PATENT DOCUMENTS

| | | |
|---|---|---|
| EP | 0 516 403 | 12/1992 |

* cited by examiner

*Primary Examiner*—James P. Trammell
*Assistant Examiner*—Kambiz Abdi
(74) *Attorney, Agent, or Firm*—Perman & Green, LLP

(57) ABSTRACT

An improved system for providing early warning preemptive postal equipment replacement. Selected performance parameters the postal equipment are monitored and compared against predetermined operational boundaries. The system is capable of providing for variability in the performance parameters, wherein these parameters may be permitted to vary over time and usage of the equipment. The monitoring gives an indication of the overall system performance. If the system performance goes outside of operational boundaries, or changes significantly over time, replacement of the equipment can then be scheduled with minimal inconvenience to the customer.

17 Claims, 3 Drawing Sheets

SYSTEM FOR PROVIDING EARLY WARNING PREEMPTIVE POSTAL EQUIPMENT REPLACEMENT

RELATED APPLICATIONS

This application is a continuation of application Ser. No. 08/981,659 filed on Dec. 22, 1997 now U.S. Pat. No. 6,098,032 which is based upon PCT Application No. PCT/US97/06837 filed Apr. 23, 1997, which claims priority from U.S. Provisional Application Ser. No. 60/015,526, filed on Apr. 23, 1996, and U.S. Provisional Application Ser. No. 60/043,445, filed on Apr. 9, 1997, both of which are hereby incorporated by reference.

TECHNICAL FIELD

The present invention relates generally to predicting when a device is likely to fail, and in particular to such prediction in postal equipment, such as postage meters, also called franking machines.

BACKGROUND ART

In countries such as the United States, the postal authority does not permit a customer to actually own a postage meter. Rather, the postal customer rents the postage meter from a manufacturer approved by the postal authority, such as the assignee of the present application. This meter is then used at the postal customer's facility.

In the United States, the postal customer traditionally adds postage to the meter in two ways. The first is to physically take the meter to the postal authority where postage is purchased and added to the meter. The second is to remotely add postage over the telephone line with a modem wherein the added postage is deducted from an account maintained with the meter's manufacturer.

While postal equipment in general, and postage meters in particular, are designed to be extremely reliable, on occasion a customer's meter has been known to fail. Generally speaking, there are two types of failures, catastrophic and non-catastrophic. The non-catastrophic is by far the most common of the two, and occurs when some component of the postage meter ceases to operate, such as the display, a mechanical linkage, etc. A catastrophic failure occurs when some or all of the information stored in nonvolatile memory is not recoverable, as discussed below.

The consequence of a non-catastrophic meter failure is primarily one of customer inconvenience. When such a failure occurs, the customer no longer has use of the equipment and must call for technical support. A field repair or replacement must then be scheduled, which further lengthens the "down time" of the equipment for the customer. In the case of a metering device, the failed device needs to be removed from service, the postal authority notified, and a replacement unit logged with the postal authority, and then finally provided to the customer. Depending on what component failed, certain information contained in the failed meter may be transferred to the replacement meter by the service technician.

In an electronic postage meter the amount of postage available for printing (or printed) is stored in a nonvolatile memory. It may be desirable to store the accounting data redundantly, as set forth in PCT pub. no. WO 89-11134, which is incorporated herein by reference. In addition, it may be desirable that the redundant memories be of differing technologies, as set forth in the aforementioned PCT publication. Finally, it is extremely desirable to protect the memory from harm due to processor malfunction, as set forth in U.S. Pat. No. 5,276,844, in EP pub. no. 527010, or in EP pub. no. 737944, each of which is incorporated herein by reference.

The user of an electronic postage meter should not be able to affect the stored postage data in any way other than reducing it (by printing postage) or increasing it (by authorized resetting activities). Some single stored location must necessarily be relied upon by all parties (the customer, the postal authority, and the provider of the meter) as the sole determinant of the value of the amount of postage available for printing. In electronic postage meters, the single stored location is the secure physical housing of the meter itself. Within the secure housing, one or more items of data in one or more nonvolatile memories serve to determine the amount of postage available for printing.

While a catastrophic failure is rare, the consequences of a catastrophic failure are far more severe, namely loss by the user of postage value for which the postal authority has already been paid. Furthermore, it is possible that in a catastrophic failure no information contained in the failed meter may be transferred to the replacement meter by the service technician. Thus, there is also the loss of historical data which may be of value to the customer.

SUMMARY OF INVENTION

In accordance with the present invention, there is provided a greatly improved system providing early warning preemptive postal equipment replacement. According to the invention, it is provided that selected performance parameters of the postal equipment are monitored and compared against predetermined operational boundaries. The monitoring gives an indication of the overall system performance. If the system performance goes outside of operational boundaries, or changes significantly, replacement can be scheduled with minimal inconvenience to the customer. Data from the old meter can then be orderly transferred to the replacement meter.

DETAILED DESCRIPTION OF THE INVENTION

Figure 1:
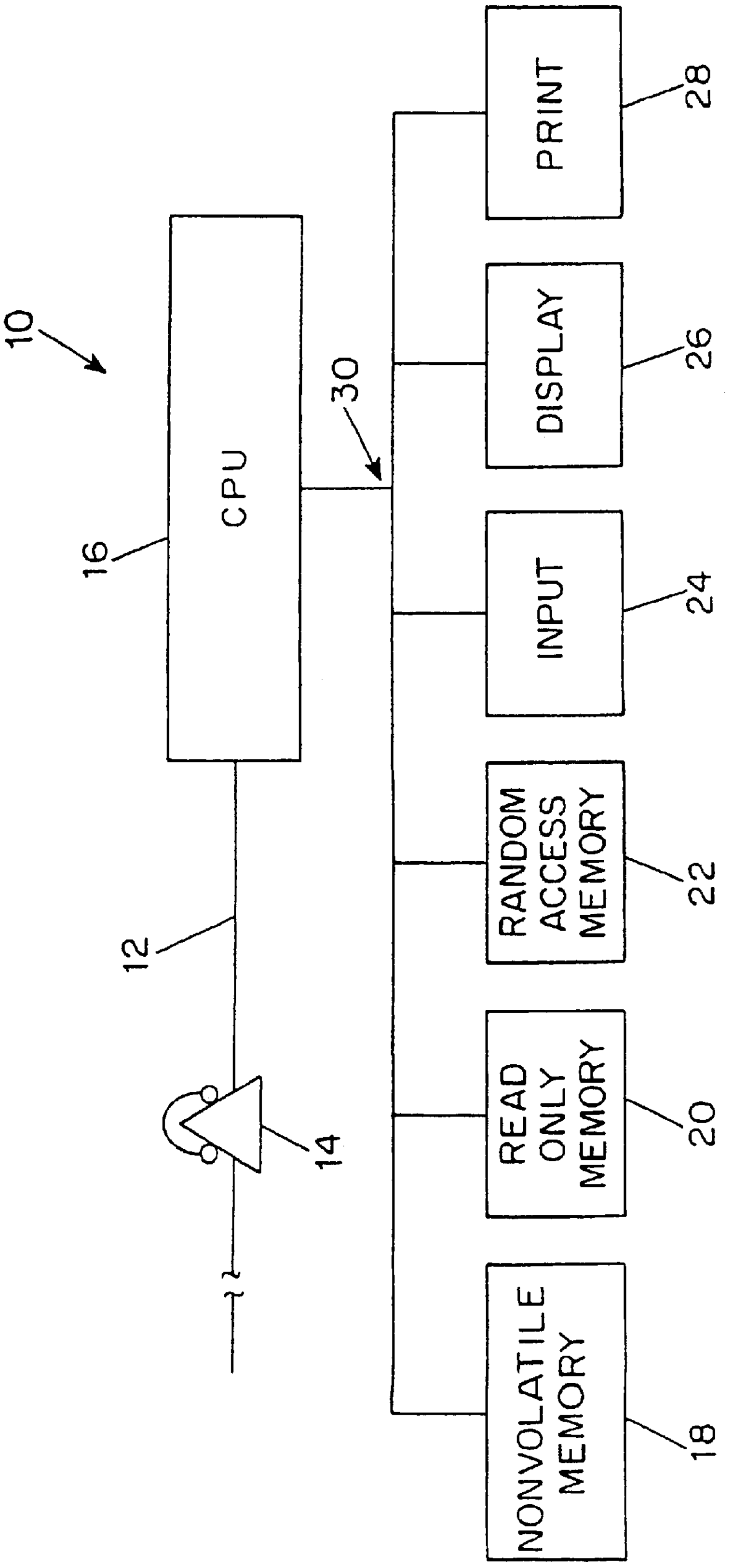
FIG. 1 is a block diagram of the system of the present invention used with a postage meter.

Referring to FIG. 1, a system in accordance with the invention is shown generally at 10, and includes a line or communications link 12 for communicating with a Data Center (not shown) used in remote resetting of postage meters having a communication device such as a telephone 14 therein, a Central Processing Unit (CPU) 16, non-volatile memory 18, read only memory (ROM) 20, random access memory (RAM) 22, input means 24, display means 26, and print means 28. The CPU 16 is connected to a Data Center through communications link or line 12. Processor 16, read only memory 18, random access memory 22, input means 24, display means 26, and print means are coupled with each other by system bus 30. The communications link 12 may be a global communications network. The display means 26 may be a liquid crystal display or other technology capable of visually presenting computer derived information.

Figure 2:
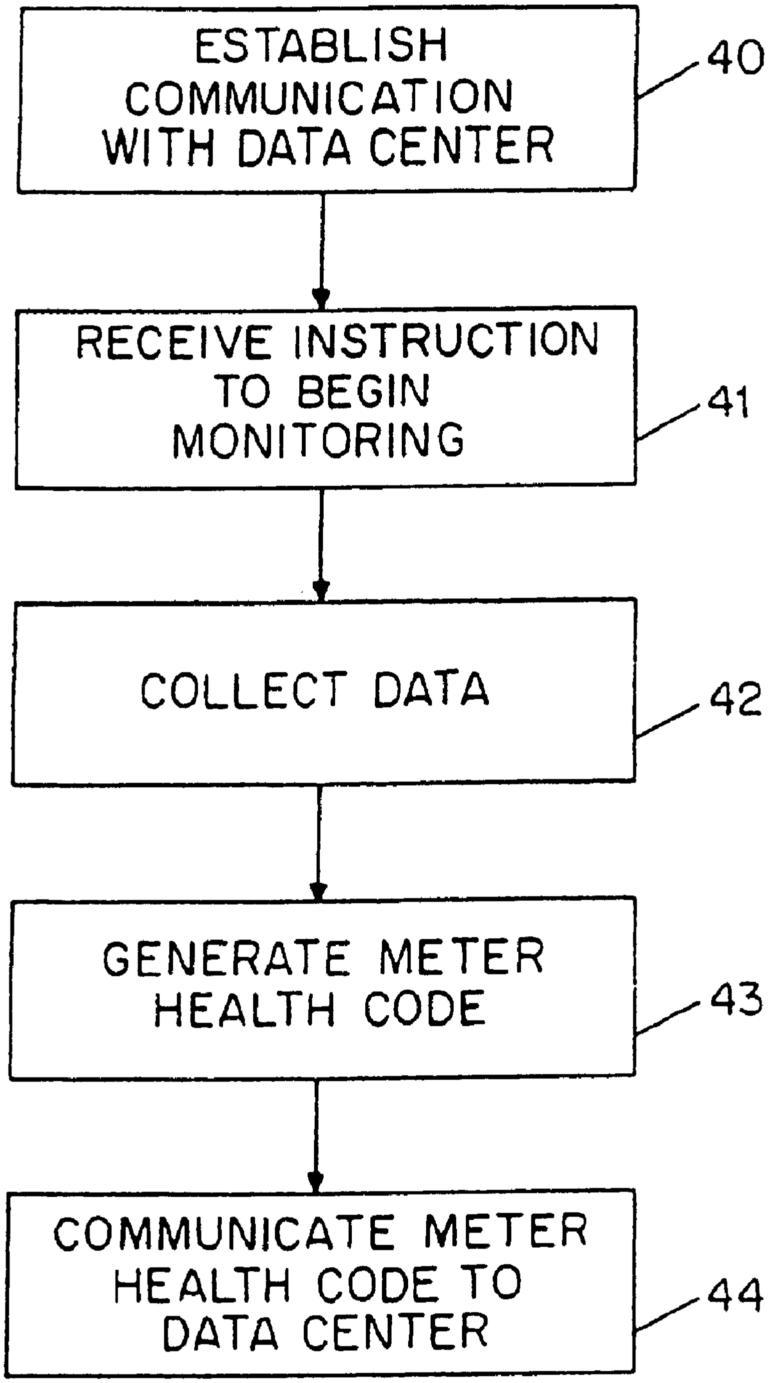
FIG. 2 is a flow chart of the method for providing early warning according to the invention.

Referring now to FIG. 2, a flow chart is shown wherein the deviation of system parameters is determined in connection with remote resetting of the meter. Generally, the meter communicates with a Data Center maintained by the meter manufacturer, which in turn communicates with a bank or other holder of funds. If funds sufficient to cover the requested amount of postage are on deposit, then that amount of postage is added to the meter. Systems for the resetting of meters remotely through the use of Data Center are known in the art. Telemeter setting (TMS) may be carried out as set forth in EPO pub. no. EP 442761, or as set forth in PCT pub. no. WO 86-05611, each of which is incorporated herein by reference.

Figure 3:
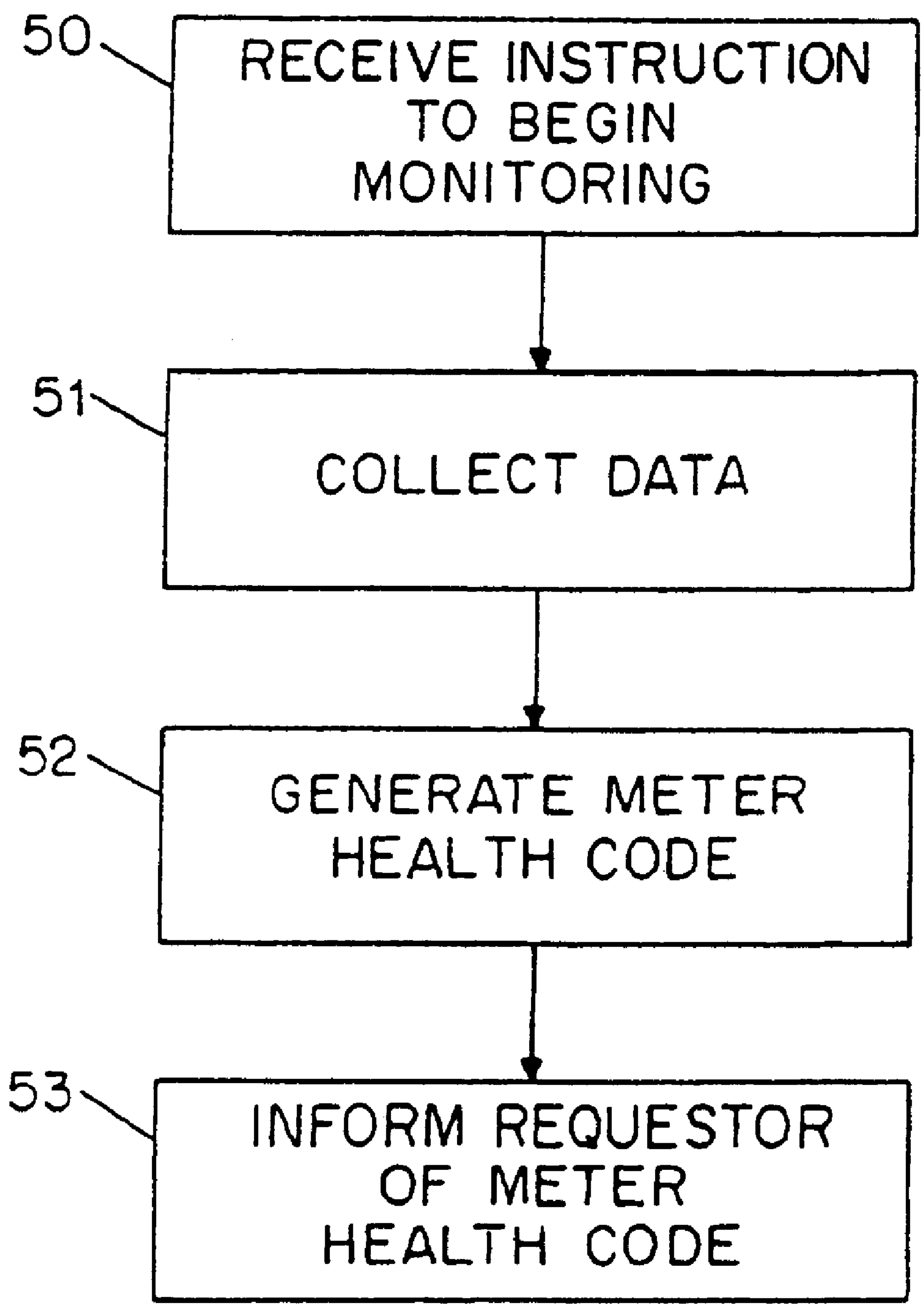
FIG. 3 is a flow chart of the method for providing early warning according to another embodiment of the invention.

Once communication has been established between processor 16 and the Data Center (FIG. 2, box 40), the processor 16 is instructed to monitor certain preselected system parameters (FIG. 2, box 41), such as motor acceleration and speed, solenoid actuation time, sensor switching time, internal diagnostic history, spare CPU band pass, non-volatile memory useable address locations remaining, display element integrity, value setting time, cycles printed, etc. (FIG. 2 box 42; FIG. 3, box 51). The motor and solenoid are typically contained in print means 28.

Processor 16 then algorithmically represents the data on the preselected system parameters through a "Metering Health Code" (MHC) (FIG. 2, box 43, FIG. 3, box 52), which periodically (for the purposes of determining the time periods between MHC generations) summarizes the performance level of the system and remains resident in the metering system, for example in non volatile memory 18. The present invention includes the capability of providing for variability in the performance measuring parameters wherein said performance monitoring parameters may be made to vary over time (e.g., aging) and usage such that it is possible and desirable to accept the performance of an older(er) product/device and yet not accept the same performance when attributed to a new product/device. The "Meter Health Code" can be stored in the postage meter and compared against predetermined parameters by the Data Center, or as preferred employment, the Data Center would also maintain a history of the postage meter's health codes and have the ability to evaluate each postage meter against its own health code degradation. In this manner, a postage meter which is degrading very slowly can be left in service longer than a postage meter that shows a more rapid degradation pattern. Another preferred embodiment of this invention is to execute a benchmark evaluation of the postage meter at the time of manufacture, said benchmark would reside within the postage meter memory as well as within the Data Center's history file applied to that specific postage meter.

The "Metering Health Code" is then communicated to the Data Center (FIG. 2, box 44) where it is evaluated to determine if the meter is a candidate for replacement. Such evaluation need not occur during the communication with the meter, but may occur at another time. Alternatively, such evaluation may occur within the meter itself, with the result of the evaluation being transmitted to the Data Center.

Rather than generate the "Meter Health Code" in the meter, and communicate the result to the Data Center for evaluation, alternatively the parameters underlying the "Metering Health Code" may be communicated to the Data Center and the "Metering Health Code" will be determined and evaluated at the Data Center.

Evaluation of the "Meter Health Code" assures the system is performing within acceptable boundaries at the time the "Meter Health Code" is determined. Furthermore, monitoring changes system performance over time is beneficial. Even if overall system performance at a given point in time is within acceptable boundaries, a change in the "Metering Health Code" would signal a need to monitor the system closely or to perform preventative maintenance, or in the case of a meter, replace it prior to a failure resulting in "down time" for the customer.

With an early warning of impending failure, a replacement can be scheduled with no inconvenience to the customer. The physical exchange could be made during a period of non-use by the customer. Furthermore, the customer's accounting and historical system information maintained within the customer's meter can be reconfigured into the new meter via modem at the time the new meter is "logged" into the Data Center. For example, said customer-use specific accounting and historical data (from the customer's existing meter) would be uploaded to the Data Center prior to meter replacement. When the new meter "logs" on with the Data Center, said customer data is downloaded into the replacement meter. The customer is now able to continue system usage without any of his customer-specific data having been changed.

Referring now to FIG. 3, a flow chart is shown wherein the generation of "Meter Health Code" occurs in response to an input from other than the Data Center during funds recharging. In this embodiment of the invention, the process of the present invention is commenced in response to the appropriate command (FIG. 3, box 50) given during a routine inspection via the modem or keyboard/display by entering a code which extracts and transmits the quantitative performance data to the Data Center or displays/prints the quantitative performance data to the user (FIG. 3, box 53).

While there have been described what are believed to be the preferred embodiments of the invention, those skilled in the art will recognize that other and further modifications may be made thereto without departing from the invention and it is intended to claim all such changes and modifications as fully within the scope of the invention.

I claim:

1. A postal equipment replacement warning system comprising:

a monitoring system for monitoring at least two preselected system parameters of the postal equipment, the postal equipment comprising a postage meter including a franking portion, a secure funds portion and a printing means; and a generating system for generating a summary of at least two of the system parameters monitored by the monitoring system, the summary being generated by algorithmically representing data on the preselected parameters as a value, wherein the generating system comprises:

a memory of predetermined system parameters; and a varying system for varying at least one of the predetermined system parameters based at least partially upon time or usage of the postal equipment, and where the warning system is adapted to compare the summary with the corresponding varied predetermined system parameters and generate a warning if replacement of the postal equipment is warranted.

2. A warning system as in claim 1 wherein the monitoring system and the generating system are contained in a postage meter.

3. A warning system as in claim 1 wherein the monitoring system is contained in a postage meter and the generating system is contained in a remote Data Center.

4. A warning system as in claim 1 wherein the monitoring system and the generating system are contained in a postage meter.

5. A warning system as in claim 1 wherein the monitoring system is contained in a postage meter and the generating system is contained in a remote Data Center.

6. The system of claim 1 wherein the summary comprises a metering health code determined by processing the monitored preselected system parameters in an algorithm.

7. The system of claim 1 wherein the varying system is adapted to adjust the monitored system parameters to account for an age of the postal equipment.

8. The system of claim 1 wherein the varying system determines an age an usage of the postal equipment and adjusts the predetermined system parameters to account for the age and adjustment.

9. The system of claim 1 wherein the summary comprises a metering health code.

10. The system of claim 9 wherein the metering health code is a value that comprises an algorithmic representation of the system parameters monitored by the monitoring system.

11. A postal equipment replacement warning system comprising:

a monitoring system for monitoring at least two preselected system parameters of postal equipment comprising a postage meter including a franking portion, a secure funds portion and a printing means; and a generating system for generating a summary of at least two of the system parameters monitored by the monitoring system, the summary being generated by algorithmically representing data on the preselected parameters as a value, wherein the generating system is adapted to periodically generate the summary, and where the warning system is adapted to compare a first in time summary to a second in time summary and generate a warning if the postal equipment warranty replacement depending on a change in value from the first in time summary to the second in time summary and a period between the first in time summary and the second in time summary.

12. The system of claim 11 wherein the generating system algorithmically represents the monitored system parameters as the summary.

13. A postal equipment replacement warning system comprising:

a monitoring system for monitoring at least two preselected system parameters of postal equipment comprising a postage meter including a franking portion, a secure funds portion and a printing means;

a generating system for periodically generating a summary of at least two of the system parameters monitored by the monitoring system the summary being generated by algorithmically representing data on the preselected parameters as a value; and a determinator for determining, based at least partially upon comparing the summary to at least one predetermined stored value representing a desired value for the at least preselected system parameters and a period of time between a change in a value of the periodically generated summary, if the postal equipment is a candidate for replacement.

14. A warning system as in claim 13 wherein the determinator comprises a history of prior summaries.

15. A warning system as in claim 13 wherein the determinator comprises means for determining a pattern of degradation of the postal equipment based at least partially upon the history of prior summaries.

16. A postal equipment replacement warning system comprising:

a monitoring system for monitoring preselected system parameters of postal equipment comprising a postage meter including a franking portion, a secure funds portion and a printing means;

a memory containing predetermined system parameters;

a varying system for varying at least one of the predetermined system parameters in the memory based at least partially upon time; and a comparing system for comparing the system parameters monitored by the monitoring system to the corresponding system parameters stored in the memory.

17. The system of claim 16 wherein the varying system determines an age and usage of the postal equipment and adjusts the predetermined system parameters to account for the age and usage.

* * * * *